United States Patent [19]

Ando

[11] Patent Number: 5,559,994
[45] Date of Patent: Sep. 24, 1996

[54] MEMORY CONTROL APPARATUS PERMITTING CONCURRENT ACCESS BY COMPRESSING ADDRESSING TIME WINDOW AND MULTIPLEXING

[75] Inventor: Tokiharu Ando, Hamamatsu, Japan

[73] Assignee: Yamaha Corporation, Japan

[21] Appl. No.: 461,168

[22] Filed: Jun. 5, 1995

Related U.S. Application Data

[63] Continuation of Ser. No. 89,759, Jul. 9, 1993, abandoned.

[30] Foreign Application Priority Data

Jul. 15, 1992 [JP] Japan ..................... 4-210944

[51] Int. Cl.$^6$ ............... G06F 13/16; G10H 7/02
[52] U.S. Cl. ........... 395/494; 370/109; 395/477; 395/495; 84/604; 84/615
[58] Field of Search ............. 370/109; 395/477, 395/494, 495, 530; 84/604, 615

[56] References Cited

U.S. PATENT DOCUMENTS

| | | | |
|---|---|---|---|
| Re. 33,738 | 11/1991 | Okumura | 84/605 |
| 4,300,161 | 11/1981 | Haskell | 348/385 |
| 4,394,760 | 7/1983 | Kammerlander | 370/111 |
| 4,623,922 | 11/1986 | Wischermann | 348/580 |
| 4,823,342 | 4/1989 | Morita et al. | 370/109 |
| 4,928,234 | 5/1990 | Kitamura et al. | 395/425 |
| 5,249,174 | 9/1993 | Itoh | 370/7 |

OTHER PUBLICATIONS

Chang et al. A Single–Frequency Duplex/Multiplex Security Communication System; IEEE; 1991.
Liu et al. Time Slot Switching for Integrated Services in Fiber Optic PBX/LAN; IEEE Transactions on Comm.; vol. 37, No. 7; Jul. 1989.

*Primary Examiner*—Ken S. Kim
*Attorney, Agent, or Firm*—Graham & James LLP

[57] ABSTRACT

A memory control apparatus that compresses the time widths of time slots of addresses sequentially outputted from a data processing unit so as to access a memory. Readout data is transferred to the data processing unit while expanding the time slot. In a vacant time formed by compressing the time widths of the time slots of the addresses from the data processing unit, refresh processing or hard disk transfer processing is executed. The time widths of the time slots of addresses sequentially outputted from a CPU are compressed so as to write data in the memory, and parallel to this operation, refresh processing can be executed in a vacant time. The memory control apparatus is suitably used in accesses of waveform data between a tone generator system and a waveform memory. Waveform data supplied from another unit can be written in the waveform memory parallel to tone generation using all tone generation channels of the tone generator system for tone generation.

22 Claims, 8 Drawing Sheets

MEMORY CONTROL APPARATUS PERMITTING CONCURRENT ACCESS BY COMPRESSING ADDRESSING TIME WINDOW AND MULTIPLEXING

This is a continuation of application Ser. No. 08/089,759 filed on Jul. 9, 1993 now abandoned.

BACKGROUND OF THE INVENTION

1. Field of the Invention

The present invention relates to a memory control apparatus and, more particularly to, a memory control apparatus, which is suitably used in, e.g., control of I/O processing of a waveform data memory for storing waveform data, in a tone generator of an electronic musical instrument.

2. Description of the Related Art

Conventionally, a tone generator system of a so-called PCM tone generation type, which sequentially reads out waveform data stored in a waveform memory at a predetermined sampling period, and generates tones based on the readout data, is known. Normally, a tone generator system has a plurality of channels, and time-divisionally executes processing of the channels. For example, a predetermined period of time is equally divided by the number of channels, and a series of processing operations of the channels are performed such that waveform data of the first channel is read out in a first time-slot interval, waveform data of the second channel is read out in a second time-slot interval, . . . . . Such processing is repeated to sequentially read out waveform data, thereby generating tones.

The write operation of waveform data in the waveform memory is separately executed. More specifically, the operation of the tone generator is temporarily stopped, and waveform data sent from another unit (e.g., waveform data obtained by sampling external tones inputted from a microphone, waveform data pre-stored in a hard disk, and the like) are written in the waveform memory. During execution of the write operation of waveform data, the tone generator cannot perform tone generation. Therefore, since the tone generation based on waveform data read out from the waveform memory cannot be executed parallel to the write operation into the waveform memory, this tone generator system cannot record/reproduce waveform data beyond the memory capacity.

In order to allow the write operation parallel to the read operation from the waveform memory, a certain system assigns some of the plurality of channels to recording channels. With this system, waveform data from, e.g., a hard disk can be written in the waveform memory while reading out waveform data from the waveform memory. Therefore, waveform data beyond the memory capacity of the waveform memory can be recorded/reproduced.

However, when some of channels are assigned to recording channels, the number of channels used for tone generation is decreased. Furthermore, when the number of channels used for transferring waveform data from, e.g., a hard disk is small, the transfer time is prolonged.

SUMMARY OF THE INVENTION

It is an object of the present invention to provide a memory control apparatus, which allows a write operation of waveform data supplied from another unit in a waveform memory parallel to tone generation using all channels of a conventional tone generator system.

According to the first aspect of the present invention, there is provided a memory control apparatus arranged between a memory and data processing means comprising: address generation means for generating first address data to execute refresh processing of the memory or data transfer processing between another unit and the memory; time slot compression means for receiving second address data sequentially outputted from the data processing means in each time slot of first time width, compressing the first time width to second time width shorter than the first time width, sequentially outputting the second address data in each time slot of the second time slot, filling the first address data in a vacant time interval formed by the compression, and sequentially outputting the first address data together with the second address data; control means for, in a time slot of the second time width in which address data sequentially outputted from the time slot compression means is the second address data, controlling to read out data from the memory based on the second address, and, for, in a time slot in which address data sequentially outputted from the time slot compression means is the first address data, controlling to execute the refresh processing of the memory or the data transfer processing between the another unit and the memory; data extraction means for extracting data sequentially read out in accordance with the second address data in each time slot of the second time width from data read out under the control of the control means, and sequentially outputting the extracted data; and time slot expansion means for expanding the second time width of the second address data sequentially outputted from the data extraction means to the first time width, and supplying the extended second address data to the data processing means in each time slot of the first time width.

The memory control apparatus according to the first aspect can be suitably used in a tone generator system of an electronic musical instrument, as has been described in the paragraphs of the related art. In this case, the memory corresponds to a tone waveform memory for storing tone waveform data, and the data processing means corresponds to a tone generator for reading out tone waveform data from the tone waveform memory.

Processing executed by utilizing an unused time interval formed by compressing the time width of the time slot is refresh processing of the memory or data transfer processing between another unit and the memory. The refresh processing is premised on a case wherein the memory comprises a DRAM (dynamic RAM).

When the present invention is applied to a tone generator system, the data transfer processing between another unit and the memory, for example, includes a data transfer operation (data read/write operation) between an auxiliary storage device such as a hard disk and the memory, a write operation of waveform data obtained by sampling an external input signal from, e.g., a microphone into the memory, a data read or write operation from a central processing unit (CPU) to or in the memory, a write operation of waveform data externally input from a MIDI device into the memory, and the like.

Furthermore, according to the second aspect of the present invention, there is provided a memory control apparatus arranged between a memory and data processing means comprising: address generation means for generating first address data to execute refresh processing of the memory or data transfer processing between another unit and the memory; address time slot compression means for receiving second address data sequentially outputted from the data processing means in each time slot of first time width, compressing the first time width to second time width shorter than the first time width, sequentially outputting the second address data in each time slot of the second time width, filling the first address data in a vacant time interval formed by the compression, and sequentially outputting the first address data together with the second address data; data time slot compression means for receiving write data sequentially outputted from the data processing means in each time slot of the first time width, compressing the first time width to the second time width, and sequentially outputting the write data in each time slot of the second time slot; and control means for, in a time slot of the second time width in which address data sequentially outputted from the address time slot compression means is the second address data, controlling to write the write data outputted from the data time slot compression means at the address of the memory, and for, in a time slot in which address data sequentially outputted from the address time slot compression means is the first address data, controlling to execute the refresh processing or the data transfer processing.

The memory control apparatus according to the second aspect can also be suitably used in a tone generator system of an electronic musical instrument, as has been described in the paragraphs of the related art. In this case, the memory corresponds to a tone waveform memory for storing tone waveform data, and the data processing means corresponds to a CPU for controlling the overall operation of an electronic musical instrument. Processing executed by utilizing a vacant time formed by compressing the time width of the time slot is the same as that in the memory control apparatus according to the first aspect. Also, an example of the data transfer processing between another unit and the memory is the same as that in the memory control apparatus according to the first aspect.

According to the third aspect of the present invention, there is provided a memory control apparatus arranged between a memory and data processing circuit comprising: address generator to generate first address data to execute refresh processing of the memory or data transfer processing between another unit and the memory; time slot compression circuit to receive second address data sequentially outputted from the data processing circuit in each time slot of first time width, to compress the first time width to second time width shorter than the first time width, sequentially to output the second address data in each time slot of the second time slot, to fill the first address data in a vacant time interval formed by the compression, and sequentially to output the first address data together with the second address data; control circuit, in a time slot of the second time width in which address data sequentially outputted from the time slot compression circuit is the second address data, to control to read out data from the memory based on the second address, and for, in a time slot in which address data sequentially outputted from the time slot compression circuit is the first address data, to control to execute the refresh processing of the memory or the data transfer processing between the another unit and the memory; data extraction circuit to extract data sequentially read out in accordance with the second address data in each time slot of the second time width from data read out under the control of the control circuit, and sequentially to output the extracted data; and time slot expansion circuit to expand the second time width of the second address data sequentially outputted from the data extraction circuit to the first time width, and to supply the extended second address data to the data processing circuit in each time slot of the first time width.

According to the fourth aspect of the present invention, there is provided a memory control apparatus arranged between a memory and data processing circuit comprising: address generator to generate first address data to execute refresh processing of the memory or data transfer processing between another unit and the memory; address time slot compression circuit to receive second address data sequentially outputted from the data processing circuit in each time slot of first time width, to compress the first time width to second time width shorter than the first time width, sequentially to output the second address data in each time slot of the second time width, to fill the first address data in a vacant time interval formed by the compression, and sequentially to output the first address data together with the second address data; data time slot compression circuit for receiving write data sequentially outputted from the data processing circuit in each time slot of the first time width, to compress the first time width to the second time width, and sequentially to output the write data in each time slot of the second time slot; and control circuit, in a time slot of the second time width in which address data sequentially outputted from the address time slot compression circuit is the second address data, to control to write the write data outputted from the data time slot compression circuit at the address of the memory, and for, in a time slot in which address data sequentially outputted from the address time slot compression circuit is the first address data, to control to execute the refresh processing or the data transfer processing.

The memory control apparatus according to the third or fourth aspect can also be suitably used in a tone generator system of an electronic musical instrument, as has been described in the paragraphs of the related art.

According to the arrangement of the first aspect of the present invention, when second address data is outputted from the data processing means present outside the memory control apparatus, and a memory read request is issued based on the outputted address, the refresh processing of the memory or the data transfer processing between another unit and the memory can be performed while executing the read operation. The memory read request from the data processing means is issued in each time slot of the first time width. More specifically, the data processing means sequentially outputs second address data in each time slot of the first time width.

The time slot compression means sequentially receives the second address data, compresses the time width of the time slot to become shorter, and sequentially outputs the second address data in each time slot of the second time width. When the first time width is compressed to the second time width, a vacant time is formed. The time slot compression means fills first address data in the vacant time interval.

The first address data is outputted from the address generation means to execute the refresh processing of the memory (only when the memory comprises a DRAM) or the data transfer processing between another unit and the memory. More specifically, when the refresh processing of the memory is executed by utilizing the vacant time formed by the time slot compression means, an address of a storage area to be refreshed corresponds to the first address data. When the data transfer processing between another unit and the memory is performed by utilizing the vacant time, a read or write address of the memory corresponds to the first address data.

In this manner, the time slot compression means outputs the first address data (outputted in the vacant time interval formed by the compression processing) and the second address data (sequentially outputted in time slots of the second time width). During the time slot intervals of the second time width in which address data sequentially outputted from the time slot compression means are the second address data, the control means reads out data from the memory based on the outputted addresses. On the other hand, during time slot intervals in which address data sequentially outputted from the time slot compression means are the first address data, the control means controls to execute the refresh processing of the memory or the data transfer processing between another unit and the memory.

Furthermore, of the data read out under the control of the control means, data read out according to the second address data are extracted by the data extraction means. Since the extracted data are data to be sequentially outputted in time slots of the second time width, the time width of each time slot in which these data are sequentially outputted is expanded by the time slot expansion means, and the data are sent to the data processing means in time slots of the first time width.

As described above, the data processing means can output address data to read out data from the memory in each time slot of the first time width. Thus, the data processing means can time-divisionally execute various kinds of data processing on the basis of the time slots of the first time width. Parallel to these operations, the refresh processing of the memory or the data transfer processing between another unit and the memory can be executed.

According to the arrangement of the second aspect of the present invention, when second address data and write data are outputted from the data processing means present outside the memory control apparatus, and a memory write request is issued based on the outputted address, the refresh processing of the memory or the data transfer processing between another unit and the memory can be performed while executing the write operation. The memory write request from the data processing means is issued in each time slot of the first time width.

DETAILED DESCRIPTION OF THE PREFERRED EMBODIMENT

The preferred embodiment of the present invention will be described hereinafter with reference to the accompanying drawings. In this embodiment, the present invention is applied to an electronic musical instrument.

Figure 1:
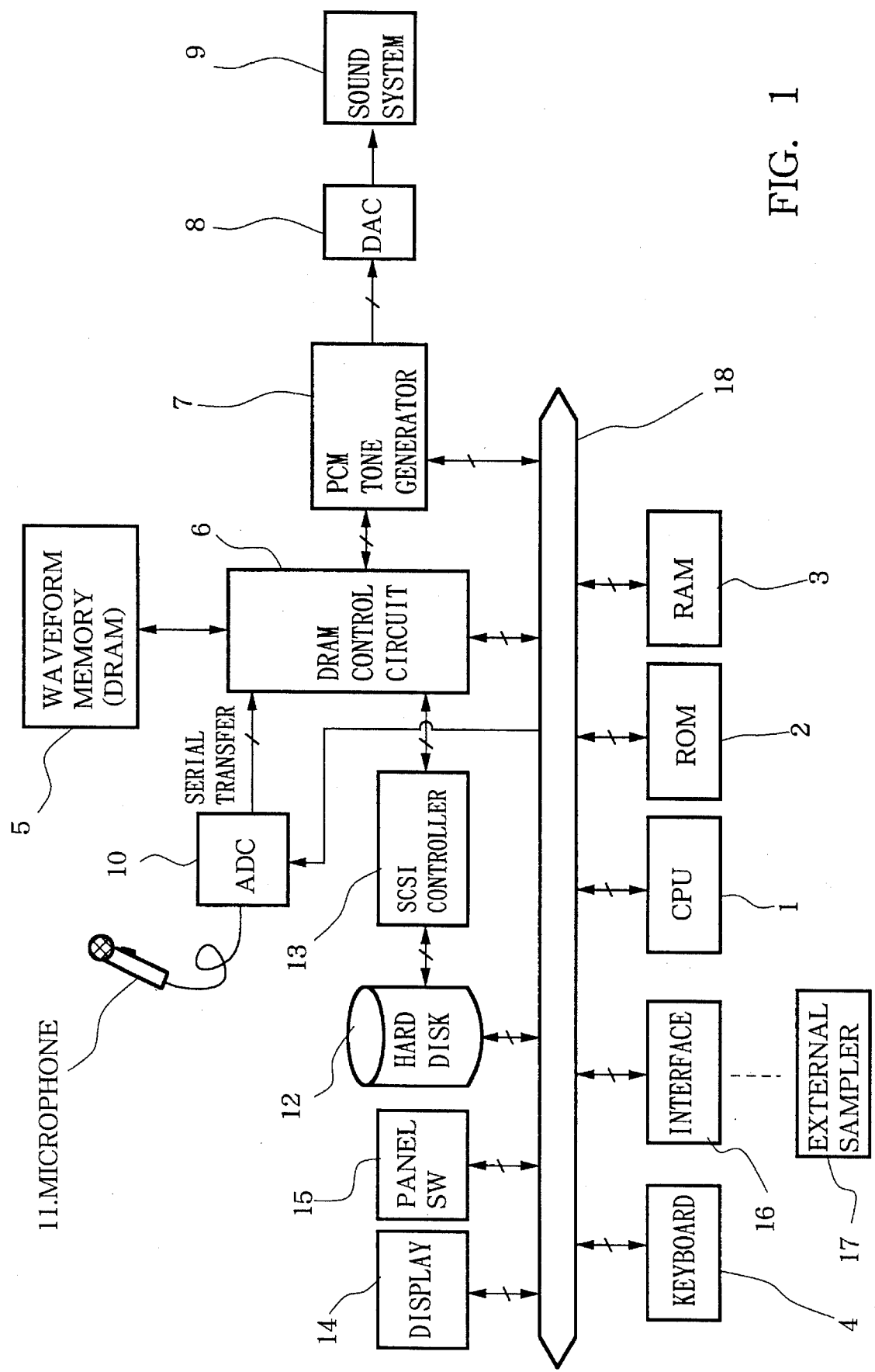
FIG. 1 is a block diagram showing an electronic musical instrument to which a memory control apparatus according to an embodiment of the present invention is applied.

FIG. 1 is a block diagram showing an electronic musical instrument to which a memory control apparatus according to an embodiment of the present invention is applied. This electronic musical instrument comprises a central processing unit (CPU) 1, a read-only memory (ROM) 2, a random access memory (RAM) 3, a keyboard 4, a waveform memory 5, a waveform memory control circuit 6, a PCM (pulse code modulation) tone generator 7, a digital-to-analog converter (DAC) 8, a sound system 9, an analog-to-digital converter (ADC) 10, a hard disk 12, a SCSI (Small Computer System Interface) controller 13, a display 14, panel switches 15, a MIDI interface 16, and a bus line 18.

The CPU 1 controls operations of the entire electronic musical instrument. The ROM 2 stores programs to be executed by the CPU 1, various constant data, table data, and the like. The RAM 3 is used as, e.g., a work area upon operation of the CPU 1. The keyboard 4 has a plurality of keys to be operated by a player. In response to performance operations of the player, the keyboard 4 outputs performance information such as key ON/OFF signals, key codes, and the like. The performance information is input to the CPU 1 via the bus line 18. The CPU 1 instructs the PCM tone generator 7 to generate tones in accordance with the input performance information.

The waveform memory 5 is a DRAM for storing tone waveform data. The waveform memory control circuit 6 controls data transfer of the waveform memory 5. Since the waveform memory 5 comprises the DRAM, the waveform memory control circuit 6 will be referred to as a DRAM control circuit hereinafter.

The PCM tone generator 7 repetitively reads out tone waveform data from the waveform memory 5 in accordance with an instruction from the CPU 1, executes predetermined processing as needed, and generates and outputs digital tone signals. The PCM tone generator 7 comprises 16 tone generation channels (the first to 16th channels), and time-divisionally executes processing of these channels. The tone signals outputted from the PCM tone generator 7 are converted into analog signals by the DAC 8, and the analog signals are inputted to the sound system 9. The sound system 9 produces actual tones based on the inputted analog tone signals.

The ADC 10 can be connected to a device for inputting an analog tone signal (e.g., a microphone 11). An analog tone signal inputted to the ADC 10 is sampled at a predetermined sampling frequency, and is converted into digital tone waveform data. The digital tone waveform data is serially transferred to the DRAM control circuit 6, and can be written in the waveform memory 5 under the control of the DRAM control circuit 6. The hard disk 12 is an auxiliary storage device for storing tone waveform data (and other data). Tone waveform data stored in the hard disk 12 is inputted to the DRAM control circuit 6 via the SCSI controller 13, and can be written in the waveform memory 5 under the control of the DRAM control circuit 6. Conversely, waveform data stored in the waveform memory 5 can be written in the hard disk 12 under the control of the DRAM control circuit 6. In place of the hard disk 12, an optical disk device may be used.

The display 14 is arranged on a panel of the electronic musical instrument so as to display various kinds of information. The panel switches 15 include switches for performing, e.g., selection of a tone color. When a tone color is selected by operating one of the panel switches 15, waveform data corresponding to the selected tone color is read out from the ROM 2 or the hard disk 12 under the control of the CPU 1, and is set in the waveform memory 5. The MIDI interface 16 can be connected to a MIDI device such as an external sampler 17. Waveform data and the like can be inputted from an external device via the MIDI interface 16.

In this electronic musical instrument, refresh processing of the waveform memory 5 and an access from another unit to the waveform memory 5 can be performed parallel to tone generation based on waveform data read out from the waveform memory 5 by the PCM tone generator 7.

As the access from another unit to the waveform memory 5, a read/write operation of waveform data between the hard disk 12 and the waveform memory 5, a write operation of waveform data inputted via the ADC 10, and a read/write operation of waveform data between the CPU 1 and the waveform memory 5 can be realized. Furthermore, in this electronic musical instrument, refresh processing of the waveform memory 5 and an access from another unit to the waveform memory 5 can be performed parallel to a write operation of waveform data in the waveform memory 5 by the CPU 1.

In order to realize such parallel processing, in the electronic musical instrument of this embodiment, the access timing between the DRAM control circuit 6 and the PCM tone generator 7 is set to be different from that between the DRAM control circuit 6 and the waveform memory 5. These access timings will be described below.

Figure 2A:
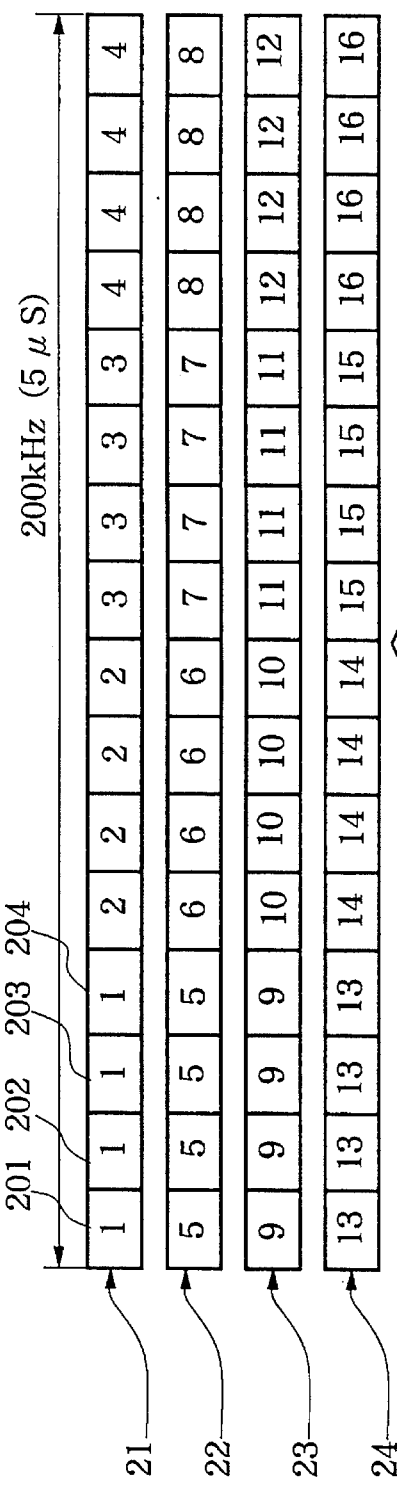
FIGS. 2A and 2B together are showing access timings between a DRAM control circuit 6 and a PCM tone generator 7 and between the DRAM control circuit 6 and a waveform memory 5.

FIG. 2A shows the access timings between the DRAM control circuit 6 and the PCM tone generator 7. In FIG. 2A, each rectangle represents a time slot. A numerical value described in the rectangle indicates that processing of a channel indicated by the numerical value is performed in that time slot interval. For example, a time slot 201 is a time slot for performing processing of the first channel.

Reference numeral 21 denotes 16 time slots for performing processing of the first to fourth channels. Reference numeral 22 denotes 16 time slots for performing processing of the fifth to eighth channels after the time slot sequence 21. Reference numeral 23 denotes 16 time slots for performing processing of the ninth to 12th channels after the time slot sequence 22. Reference numeral 24 denotes 16 time slots for performing processing of the 13th to 16th channels after the time slot sequence 23.

Four time slots are assigned to each channel to access the waveform memory four times per channel to obtain four waveform data. For example, the PCM tone generator 7 sequentially outputs addresses of the waveform memory 5 respectively in the intervals of the four time slots 201 to 204 to obtain four waveform data, and executes interpolation processing using these data to generate one digital tone signal per channel. As for other channels, the PCM tone generator 7 generates one digital tone signal using four waveform data.

Each of the time slot sequences 21 to 24 has a duration of 5 μsec (200 kHz). Since digital tone signals can be generated one each for all the channels using 16×4 time slots in the four sequences 21 to 24, the PCM tone generator 7 completes processing of all the channels in 20 μsec (50 kHz). The PCM tone generator 7 executes processing by repeating the above-mentioned operation.

In a conventional system, since a PCM tone generator and a waveform memory are directly connected to each other, the PCM tone generator outputs address data in each time slot interval shown in FIG. 2A to acquire required waveform data. On the other hand, in the electronic musical instrument of this embodiment, address data sequentially outputted from the PCM tone generator 7 in the time slot intervals shown in FIG. 2A are inputted to the DRAM control circuit 6. The DRAM control circuit 6 compresses the time slots shown in FIG. 2A to form a vacant time, and fills refresh addresses or addresses for data transfer between the hard disk and the waveform memory, and the like in the vacant time intervals, thereby accessing the waveform memory 5.

Figure 2B:
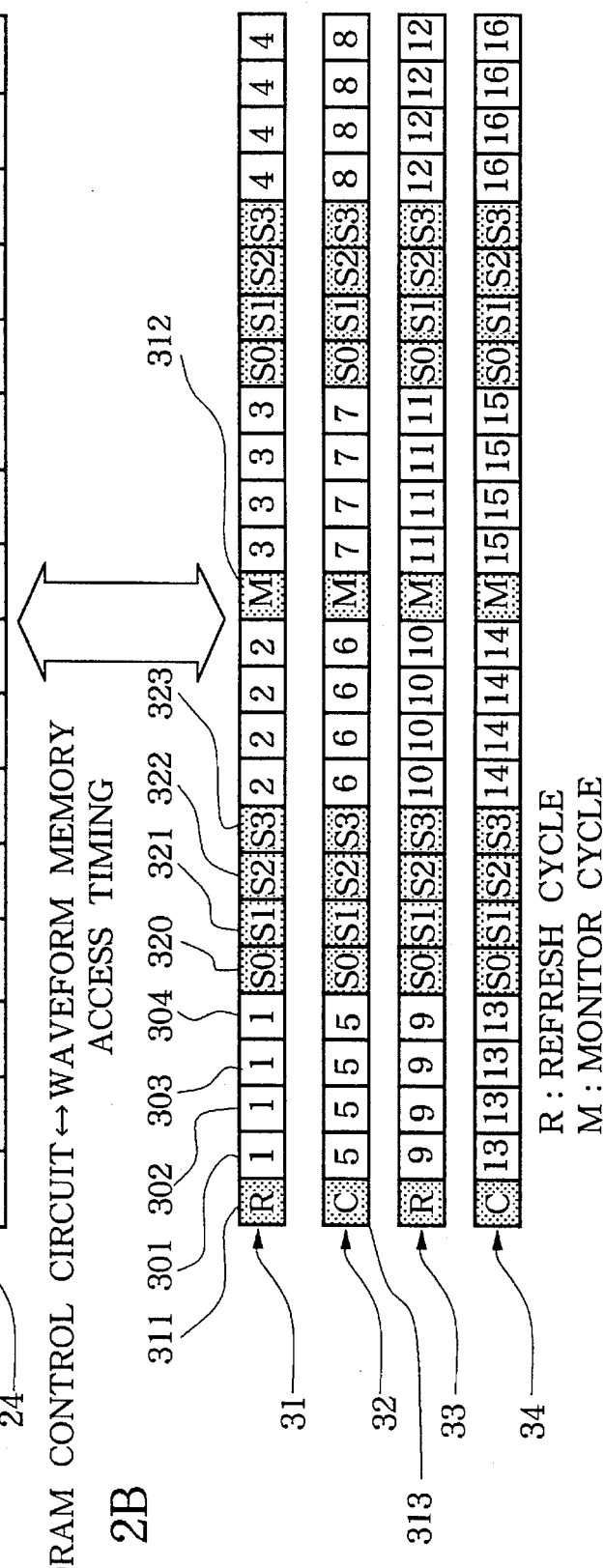

FIG. 2B shows the access timings between the DRAM control circuit 6 and the waveform memory 5. In FIG. 2B, each rectangle represents a time slot used for accessing from the DRAM control circuit 6 to the waveform memory 5.

Reference numeral 31 denotes a time slot sequence in which predetermined address data are filled in vacant time intervals formed by compressing the time slot sequence 21 shown in FIG. 2A. Reference numeral 32 denotes a sequence following the time slot sequence 31, i.e., a time slot sequence in which predetermined address data are filled in vacant time intervals formed by compressing the time slot sequence 22 shown in FIG. 2A. Reference numeral 33 denotes a sequence following the time slot sequence 32, i.e., a time slot sequence in which predetermined address data are filled in vacant time intervals formed by compressing the time slot sequence 23 shown in FIG. 2A. Reference numeral 34 denotes a sequence following the time slot sequence 33, i.e., a time slot sequence in which predetermined address data are filled in vacant time intervals formed by compressing the time slot sequence 24 shown in FIG. 2A.

The duration of each of the sequences 31 to 34 is 5 μsec (200 kHz) as in FIG. 2A. Therefore, the time required for completing processing of all the time slots in the four sequences 31 to 34 is 20 μm (50 kHz) as in FIG. 2A.

A numerical value described in each rectangle indicates a channel number, and corresponds to the interval of each time slot shown in FIG. 2A. For example, the four time slots 201 to 204 in FIG. 2A are compressed, and correspond to four time slots 301 to 304 in FIG. 2B. Therefore, when waveform data is read out by the PCM tone generator 7, address data sequentially outputted from the PCM tone generator 7 in the time intervals of the time slots 201 to 204 are compressed by the DRAM control circuit 6, and are sent to the waveform memory 5 in the time intervals of the time slots 301 to 304. The same applies to other time slots in FIG. 2A.

A vacant time interval formed by compression in FIG. 2B will be described below.

In an interval of a time slot 311, the DRAM control circuit 6 outputs a refresh address R (and a control signal for refresh processing) to the waveform memory 5. Thus, the refresh processing of the waveform memory 5 is executed. The same applies to a time slot described with "R" at the beginning of the sequence 33 in FIG. 2B.

In an interval of a time slot 312, the DRAM control circuit 6 outputs an address M of an area in the waveform memory where waveform data inputted from the ADC 10 is to be written to the waveform memory 5. Thereafter, the DRAM control circuit 6 outputs the waveform data itself inputted from the ADC 10 to the waveform memory 5. Thus, write processing (so-called PCM recording) of waveform data inputted from an external device such as the microphone 11 via the ADC 10 in the waveform memory 5 is performed. The same applies to time slots described with "M" in the middle of each of the sequences 32 to 34 in FIG. 2B. In this embodiment, when the four time slots described with "M" in FIG. 2B are time-divisionally used, external waveform data for four channels can be recorded.

In an interval of a time slot 313, the DRAM control circuit 6 outputs an address C of an area in the waveform memory in or from which waveform data is written or read out by the CPU 1 to the waveform memory 5. Thereafter, in the case of the write processing in the waveform memory 5, the DRAM control circuit 6 also outputs write data inputted from the CPU 1 to the waveform memory 5. In the case of the read processing from the waveform memory 5, the DRAM control circuit 6 transfers data read out from the waveform memory 5 to the CPU 1 (by storing it in a predetermined register). In this manner, the access processing from the CPU 1 to the waveform memory 5 can be performed. The same applies to a time slot described with "C" at the beginning of the sequence 34 in FIG. 2B.

In intervals of time slots 320 to 323, the DRAM control circuit 6 outputs addresses S0 to S3 (successive addresses) of an area in the waveform memory in or from which waveform data is to be written or read out by data transfer processing (SCSI DMA processing) between the hard disk 12 and the waveform memory 5. Thereafter, when waveform data in the hard disk 12 is to be written in the waveform memory 5, the DRAM control circuit 6 outputs waveform data read out from the hard disk 12 to the waveform memory 5. When waveform data read out from the waveform memory 5 is to be written in the hard disk 12, the DRAM control circuit 6 outputs waveform data read out from the waveform memory 5 to the hard disk 12. In this manner, the data transfer processing between the hard disk 12 and the waveform memory 5 can be performed. The same applies to time slots described with "S0" to "S3" in the second half of the sequence 31 in FIG. 2B, and time slots described with "S0" to "S3" in the first and second halves of the sequences 32 to 34 in FIG. 2B.

FIG. 2A shows the access timings when waveform data is read out by the PCM tone generator 7. In the electronic musical instrument of this embodiment, waveform data can be written in the waveform memory 5 by the CPU 1 at these access timings. In this case, the CPU 1 outputs write addresses to the DRAM control circuit 6 in the time slots shown in FIG. 2A, and then outputs write data. The DRAM control circuit 6 compresses the time slots, as described above, and writes data in the waveform memory 5 at the access timings shown in FIG. 2B. The vacant time is utilized in the same manner as the read operation by the PCM tone generator 7.

The arrangement of the DRAM control circuit 6 will be described in detail below.

Figure 3:
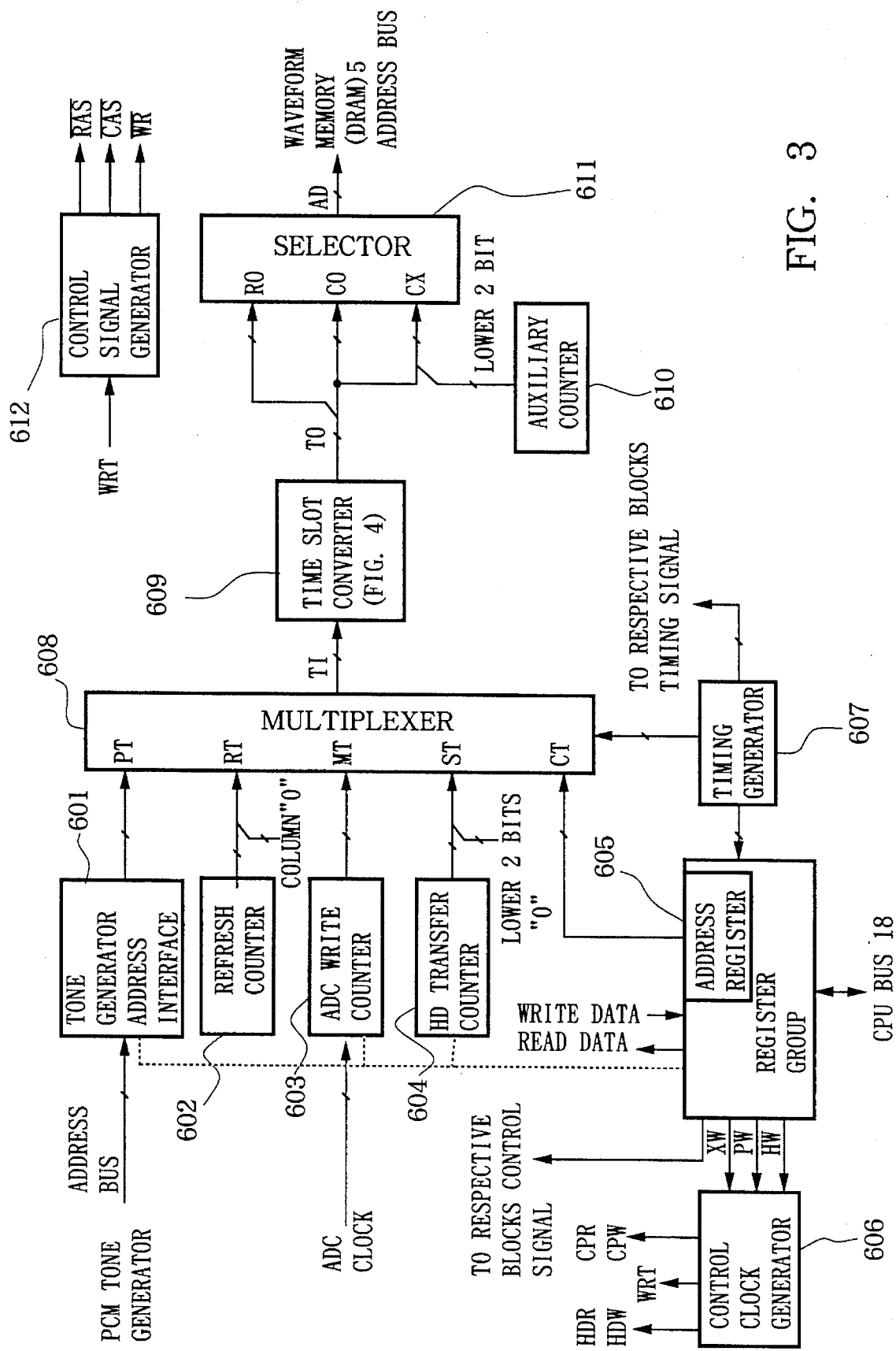
FIG. 3 is a block diagram (No. 1) of the DRAM control circuit.

FIG. 3 is a partial block diagram of the DRAM control circuit 6. FIG. 3 illustrates a portion for processing address data of the DRAM control circuit 6. In FIG. 3, the DRAM control circuit 6 comprises a tone generator address interface 601, a refresh counter 602, an ADC write counter 603, a hard disk transfer counter 604, a register group 605, a control clock generator 606, a timing generator 607, a multiplexer 608, a time slot converter 609, an auxiliary counter 610, a selector 611, and a control signal generator 612.

Figure 4:
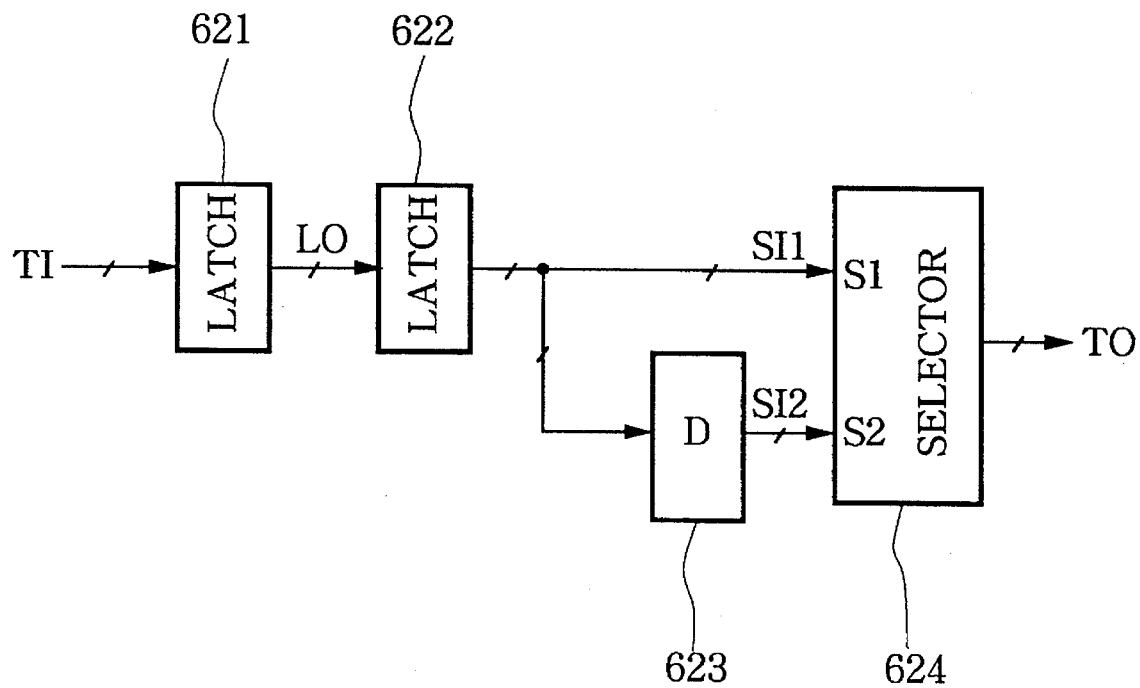
FIG. 4 is a block diagram of a time slot converter.

FIG. 4 is a block diagram of the time slot converter 609 shown in FIG. 3. The time slot converter 609 comprises latches 621 and 622, a delay circuit 623, and a selector 624.

Referring to FIG. 3, the tone generator address interface 601 receives address data outputted from the PCM tone generator 7 onto an address bus. Address data outputted from the PCM tone generator 7 is inputted to an input terminal PT of the multiplexer 608 via the tone generator address interface 601. When the CPU 1 outputs an address (at the timings shown in FIG. 2A) to write data in the waveform memory 5 in place of the read operation of waveform data by the PCM tone generator 7, the address is inputted from a predetermined register in the register group 605 to the input terminal PT of the multiplexer 608 via the tone generator address interface 601.

The refresh counter 602 generates a refresh address of the waveform memory 5. The refresh counter 602 is incremented every time the refresh processing is executed.

Note that the waveform memory 5 comprising a DRAM receives an address obtained by multiplexing a row address and a column address. In the refresh processing, the waveform memory 5 receives only the row address to refresh all bits stored at the received row address. For this purpose, the refresh counter 602 is a counter for counting only an upper-bit portion, corresponding to the row address, of address data, and bits in a lower-bit portion corresponding to the column address are set to be all "0"s. A refresh address R obtained by combining the output from the refresh counter 602 representing the row address and a column address portion "0" is inputted to the input terminal RT of the multiplexer 608.

The ADC write counter 603 is incremented based on an operation clock signal of the ADC 10. The value of this counter 603 corresponds to an address M on the waveform memory 5 where waveform data outputted from the ADC 10 is to be written, and is inputted to an input terminal MT of the multiplexer 608. When the CPU 1 writes an initial value in a predetermined register in the register group 605, the initial value (write start address) is set in the counter 603. The ADC 10 converts an external tone inputted from the microphone 11 into digital waveform data according to the operation clock signal, and outputs the digital waveform data. The value of the counter 603, i.e., the write address M is incremented every time the ADC 10 outputs waveform data.

The count value of the hard disk transfer counter 604 represents an address S on the waveform memory 5 used when data transfer between the hard disk 12 and the waveform memory 5 is performed. More specifically, the count value represents a write address when waveform data stored in the hard disk 12 is transferred to the waveform memory 5, and represents a read address when waveform data stored in the waveform memory 5 is transferred to the hard disk 12.

A read or write operation is performed in the lump of four waveform data. For example, in the case of transfer from the hard disk 12 to the waveform memory 5, when four waveform data read out from the hard disk 12 are collected (a FIFO circuit in FIG. 5 (to be described later)), the content of the counter 604 is incremented. As a result, the value of the counter 604 represents a write start address (data excluding lower 2 bits in practice) on the waveform memory 5 where four waveform data are to be successively written. The value of the counter 604 is outputted to an input terminal ST of the multiplexer 608.

Since the four waveform data are written in four areas having successive addresses on the waveform memory 5, the value of the counter 604 represents an address excluding lower 2 bits, and the lower 2 bits are forcibly set to be "0". The lower 2 bits are set to be "0" to "3" by the auxiliary counter 610 in the next stage.

The register group 605 is connected to the bus line 18 of the CPU 1. The CPU 1 can read and write data from and in all registers included in the register group 605. The register group 605 comprises a read data register for storing waveform data read out from the waveform memory 5, and a write data register for storing waveform data to be written in the waveform memory 5. The register group 605 also comprises a register in which the initial value of the ADC write counter 603 is set, a register in which the initial value of the hard disk transfer counter 604 is set, and a register in which an address to be inputted to the tone generator address interface 601 is set.

Furthermore, the register group 605 comprises an address register for holding an address on the waveform memory 5 used when the CPU 1 accesses the waveform memory 5. An output C from the address register is inputted to an input terminal CT of the multiplexer 608.

In addition, the register group 605 comprises various control registers. When the CPU 1 writes control data in these control registers, the control data are outputted to the corresponding units as control signals. In particular, control signals XW, PW, and HW are inputted to the control clock generator 606. The control clock generator 606 receives the control signals XW, PW, and HW, and generates various control clocks HDR, HDW, WRT, CPR, and CPW.

The control signal generator 612 receives a write/read signal WRT from the control clock generator 606, and generates a row address strobe signal RAS, a column address strobe signal CAS, and a write control signal WR.

These control signals and control clocks will be described below.

① XW: a control signal for discriminating whether data is written in or read out from the waveform memory 5 when a slot present at the beginning or in the middle of each of the sequences 31 to 34 shown in FIG. 2B, i.e., the refresh address R, the access address C from the CPU 1, or the data write address M from the ADC 10 is inputted to the waveform memory 5. The value of the control signal XW is determined according to an instruction from the CPU 1. In practice, when the refresh address R is inputted to the waveform memory 5, since neither the read operation nor write operation are performed, the value of the control signal XW need not be determined. When the data write address M from the ADC 10 is inputted to the waveform memory 5, since the write operation is to be performed, the control signal XW has a value for indicating the write operation. When the access address C from the CPU 1 is inputted to the waveform memory 5, a value instructed by the CPU 1 is outputted as the control signal XW.

② PW: a control signal for discriminating whether data is written in or read out from the waveform memory 5 when addresses are inputted to the waveform memory 5 in slots described with channel numbers "1" to "16" in the sequences 31 to 34 in FIG. 2B. The value of the control signal PW is determined according to an instruction from the CPU 1. When waveform data is read out by the PCM tone generator 7, the control signal PW has a value for instructing the read operation; when the waveform data is written by the CPU 1, the control signal PW has a value for instructing the write operation.

③ HW: a control signal for discriminating whether data is written in or read out from the waveform memory 5 when addresses S0 to S3 are inputted to the waveform memory 5 in slots for outputting these addresses upon execution of data transfer with the hard disk 12 in the sequences 31 to 34 shown in FIG. 2B. The value of the control signal HW is determined according to an instruction from the CPU 1. When data is read out from the hard disk 12, and is written in the waveform memory 5, the control signal HW has a value for instructing the write operation; when data is read out from the waveform memory 5, and is written in the hard disk 12, the control signal HW has a value for instructing the read operation.

④ HDR: When addresses S0 to S3 are outputted in the slots for outputting these addresses in the sequences 31 to 34 in FIG. 2B so as to read out data from the waveform memory 5, since four data are successively read out, and are sent to the hard disk 12 together, the DRAM control circuit 6 comprises a FIFO circuit (denoted by reference numeral 639 in FIG. 5 to be described later) for temporarily storing four data. The control clock HDR is a write control clock used when data read out from the waveform memory 5 are stored in this FIFO circuit.

⑤ HDW: When addresses S0 to S3 are outputted in the slots for outputting these addresses in the sequences 31 to 34 in FIG. 2B so as to write data (read from the hard disk 12) in the waveform memory 5, since four data are successively written, the DRAM control circuit 6 comprises a FIFO circuit (denoted by reference numeral 641 in FIG. 5 to be described later) for temporarily storing four data from the hard disk 12. The control clock HDW is a read control clock used when data temporarily stored in this FIFO circuit are to be read out.

⑥ WRT: a write/read signal WRT for discriminating whether data is written in or read out from the waveform memory 5 in time slot intervals in which the addresses are inputted to the waveform memory 5 at the access timings shown in FIG. 2B. Of the time slots shown in FIG. 2B, when the addresses R, C, and M are inputted to the waveform memory, the above-mentioned control signal XW is outputted as the write/read signal WRT; when addresses are inputted to the waveform memory 5 in slots described with the channel numbers "1" to "16", the above-mentioned control signal PW is outputted as the write/read signal WRT; and when addresses S0 to S3 are inputted to the waveform memory 5, the above-mentioned control signal HW is outputted as the write/read signal WRT.

⑦ RAS, CAS: a row address strobe signal and a column address strobe signal. These signals are inputted to the waveform memory 5 comprising a DRAM in negative logic. When address data is inputted to the waveform memory 5, and these strobe signals go to low level, the row and column addresses are fetched by the waveform memory 5.

⑧ WR: a write control signal inputted to the waveform memory 5 comprising a DRAM in negative logic. When this control signal goes to low level, the data write operation in the waveform memory 5 is executed. As a method of writing data in a DRAM, a method of setting the write control signal WR at low level before an address is determined is also available. In either method, the control signal generator 612 outputs the write control signal WR at a proper timing on the basis of the write/read signal WRT.

Referring to FIG. 3, the multiplexer 608 determines which one of input data at the input terminals PT, RT, MT, ST, and CT is to be selected and outputted on the basis of a timing signal supplied from the timing generator 607. The timing generator 607 generates various timing signals. Output data TI from the multiplexer 608 is inputted to the time slot converter 609. The time slot converter 609 will be described below with reference to FIG. 4.

The input data TI to the time slot converter 609 is latched by the latch 621. Output data LO from the latch 621 is latched by the latch 622. Output data SI1 from the latch 622 is inputted to an input terminal S1 of the selector 624 and the delay circuit 623. The delay circuit 623 delays the input data by a predetermined period of time. Output data SI2 from the delay circuit 623 is inputted to an input terminal S2 of the selector 624.

The selector 624 selects and outputs input data SI1 or SI2 in accordance with the timing signal outputted from the timing generator 607. The output data from the selector 624 is outputted as output data TO of the time slot converter 609.

Referring again to FIG. 3, the output data (address data) TO outputted from the time slot converter 609 is inputted to input terminals R0 and C0 of the selector 611. Input data to R0 is a row address, and input data to C0 is a column address. The data TO is also inputted to an input terminal CX of the selector 611 together with the output from the auxiliary counter 610. The timings of these input data and selected outputs of the selector 611 will be described in detail later. Output data AD from the selector 611 serves as address data AD to be outputted from the DRAM control circuit 6 to the waveform memory 5.

Figure 6:
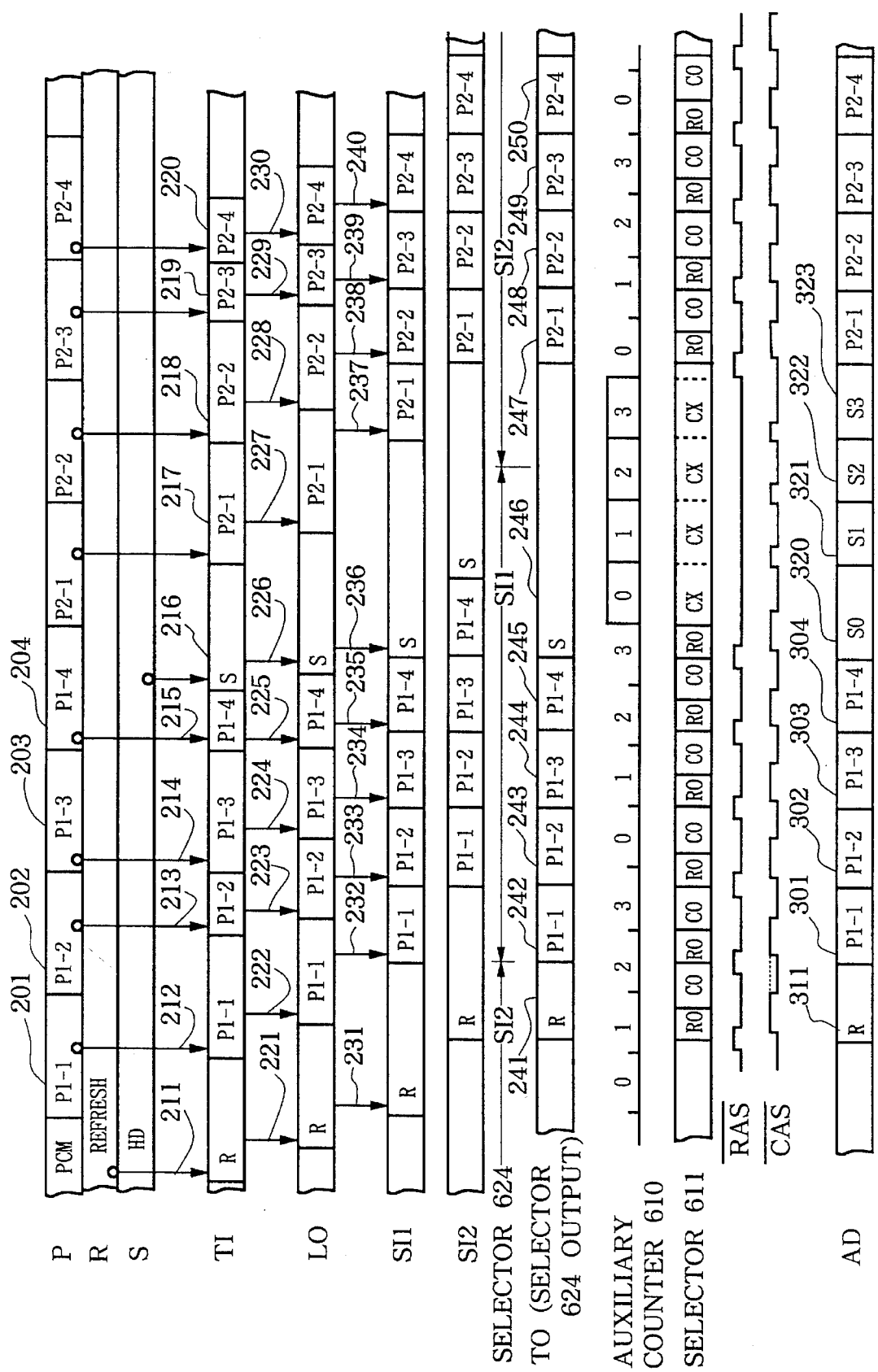
FIG. 6 is a timing chart for explaining address data processing.

FIG. 6 is a timing chart for explaining address data processing in the DRAM control circuit 6 in FIG. 3. The address data processing will be described below with reference to the timing chart of FIG. 6, and the block diagrams of FIGS. 3 and 4.

In FIG. 6, sequences P, R, and S respectively represent data P, R, and S to be inputted to the input terminals PT, RT, and ST of the multiplexer 608. The sequence P representing address data inputted from the PCM tone generator 7 to the input terminal PT of the multiplexer 608 corresponds to eight time slots in the first half of the sequence 21 shown in FIG. 2A.

A description "P1-1" in the rectangle of a time slot 201 in FIG. 6 indicates that data inputted to the input terminal P of the multiplexer 608 in this time slot interval is the first address data for the first channel of the PCM tone generator 7. Similarly, descriptions "P1-2", "P1-3", and "P1-4" in time slots 202 to 204 indicate that data inputted to the input terminal P in these time slot intervals are the second to fourth address data for the first channel. The same applies to the descriptions "P2-1", "P2-2", "P2-3", and "P2-4" in four time slots for the second channel.

A sequence TI in FIG. 6 represents output data from the multiplexer 608 in FIG. 3. Arrows 211 to 220 indicate inputs selected and outputted by the multiplexer 608 at the corresponding timings. At the timing of the arrow 211 slightly before the beginning of the time slot 201, the multiplexer 608 selects and outputs the refresh address R at the input terminal RT. At the timings of the arrows 212 to 215, the multiplexer 608 selects and outputs the address data P1-1 to P1-4 from the PCM tone generator 7 at the input terminal PT. At the timing of the arrow 216, the multiplexer 608 outputs the address data S which is inputted to the input terminal ST and is used for data transfer with the hard disk. At the timings of the arrows 217 to 220, the multiplexer 608 outputs the address data P2-1 to P2-4 from the PCM tone generator 7 at the input terminal PT. Such multiplexing processing in the multiplexer 608 is executed based on the timing signal supplied from the timing generator 607.

The output data TI from the multiplexer 608 is latched by the latch 621 (FIG. 4) of the time slot converter 609. Arrow 221 to 230 in FIG. 6 indicate latch timings of the latch 621. These latch timings are determined based on the timing signals supplied from the timing generator 607. A sequence LO in FIG. 6 represents the output data LO from the latch 621 (FIG. 4).

The output data LO from the latch 621 is latched by the latch 622. Arrows 231 to 240 in FIG. 6 indicate latch timings of the latch 622. These latch timings are determined based on the timing signals supplied from the timing generator 607. A sequence SI1 in FIG. 6 represents output data from the latch 622, i.e., input data SI1 to the input terminal S1 of the selector 624. The output data from the latch 622 is inputted to the delay circuit 623 to be delayed by a predetermined period of time, and the delayed data is outputted. A sequence SI2 in FIG. 6 represents the output data SI2 from the delay circuit 623.

The selector 624 selects and outputs the data SI1 inputted to the input terminal S1 or the data SI2 inputted to the input terminal S2 on the basis of the timing signal supplied from the timing generator 607. As shown in "selector 624" in FIG. 6, the selector 624 selects and outputs the input data SI2 until the timing (arrow 232) at which the latch 622 latches the address data P1-1, then selects and outputs the input data SI1 until the hard disk transfer addresses S are outputted as both the input data SI1 and SI2, and thereafter, selects and outputs the input data SI2. Therefore, the output data TO (the output from the time slot converter 609) from the selector 624 are outputted, as shown in a sequence TO in FIG. 6.

Referring to FIG. 3, of the output data (address data) TO from the time slot converter 609, an upper-bit portion corresponding to the row address is inputted to the input terminal R0 of the selector 611. Of the output data TO, a lower-bit portion corresponding to the column address is inputted to the input terminals C0 and CX of the selector 611. In this case, the lower 2 bits of the input terminal CX of the selector 611 are connected to the output (2 bits) from the auxiliary counter 610 in place of the output data TO.

As shown in "auxiliary counter 610" in FIG. 6, the auxiliary counter 610 repetitively outputs "0" to "3" in decimal notation ("00", "01", "10", and "11" as bit data). In particular, in an interval 246 in which the output data TO from the time slot converter 609 is the address data S used for data transfer with the hard disk, the auxiliary counter 610 outputs a series of "0" to "3" in decimal notation once.

The selector 611 selects the input terminal R0, C0, or CX in accordance with the timing signal outputted from the timing generator 607. The selection timings are shown in "selector 611" in FIG. 6. In FIG. 6, in an interval 241 in which the refresh address R is outputted as the output data TO, the selector 611 sequentially selects and outputs data at the input terminals R0 and C0. Thus, in the interval 241, the row and column addresses of the refresh address R (since the column address is unnecessary data in the refresh processing, it is set to be "0") are outputted.

In an interval 242 in which the address data P1-1 from the PCM tone generator 7 is outputted as the output data TO, the selector 611 sequentially selects and outputs data at the input terminals R0 and C0. Thus, in the interval 242, the row and column addresses of the read address P1-1 supplied from the PCM tone generator 7 are outputted. The same applies to intervals 243 to 245 in which the address data P1-2 to P1-4 are outputted as the output data TO.

In the interval 246 in which the hard disk transfer address S is outputted as the output data TO, the selector 611 selects and outputs data at the input terminal R0 first. Thus, the row address of the hard disk transfer address S is outputted. Then, the selector 611 selects and outputs data at the input terminal CX in intervals in which the auxiliary counter 610 counts "0" to "3". Thus, four column addresses (lower 2 bits include a corresponding one of "0" to "3" from the auxiliary counter 610) of the hard disk transfer address S are outputted.

A row address is outputted once, and then, four column addresses are successively outputted to perform data transfer between the waveform memory 5 and the hard disk 12 using a high-speed access mode in the DRAM (waveform memory 5). In such data transfer, since the read/write addresses of the waveform memory 5 are successive, the auxiliary counter

15

610 forcibly sets one of "0" to "3" in lower 2 bits of each address to generate the addresses. The high-speed access mode of the DRAM includes, e.g., a page mode, an enhancement mode, a static column mode, and the like.

In FIG. 6, in intervals 247 to 250 in which the address data P2-1 to P2-4 from the PCM tone generator 7 are outputted as the output data TO, the row and column addresses of the read addresses P2-1 to P2-4 supplied from the PCM tone generator 7 are outputted in the same manner as the above-mentioned address data P1-1 to P1-4.

In this manner, the output data from the selector 611, i.e., the address data AD outputted from the DRAM control circuit 6 to the waveform memory 5 are generated and outputted. A lowermost sequence AD in FIG. 6 represents the output address data AD, and corresponds to 13 time slots in the first half of the sequence 31 shown in FIG. 2B. This address data AD is the address outputted from the DRAM control circuit 6 to the waveform memory 5. Note that a pair of row and column addresses in the sequence AD in FIG. 6 are expressed by a single rectangle in correspondence with FIG. 2B.

In synchronism with the address data AD outputted in this manner, the control signal generator 612 (FIG. 3) outputs the row address strobe signal RAS and the column address strobe signal CAS, and the waveform memory 5 fetches the read/write address. A lower chart in FIG. 6 shows the timings of the row address strobe signal RAS and the column address strobe signal CAS. In each time slot in which the address data AD outputted from the DRAM control circuit 6 and inputted to the waveform memory 5 is a row address, the row address strobe signal RAM (negative logic) goes to low level, and the waveform memory 5 fetches the row address in response to this signal. In each time slot in which the address data AD is a column address, the column address strobe signal CAS (negative logic) goes to low level, and the waveform memory 5 fetches the column address in response to this signal.

The processing for generating and outputting address data (AD in FIG. 6) particularly in 13 time slots in the first half of the sequence 31 in FIG. 2B have been described. Processing for generating and outputting address data in the second half of the sequence 31 and in the first and second halves of the sequences 32 to 34 in FIG. 2B is also performed in the same manner as described above.

In this case, in the processing for generating and outputting address data in the second half in each of the sequences 31 to 34, the write address M used for writing waveform data from the ADC 10 must be outputted. For this reason, the multiplexer 608 selects and outputs the output M from the ADC write counter 603 in place of the output from the refresh counter 602. In the processing for generating and outputting address data in the first half in each of the sequences 32 and 34, the access address C from the CPU 1 must be outputted in place of the refresh address R. For this reason, the multiplexer 608 selects and outputs the value of the address register in the register group 605 in place of the output from the refresh counter 602.

Figure 5:
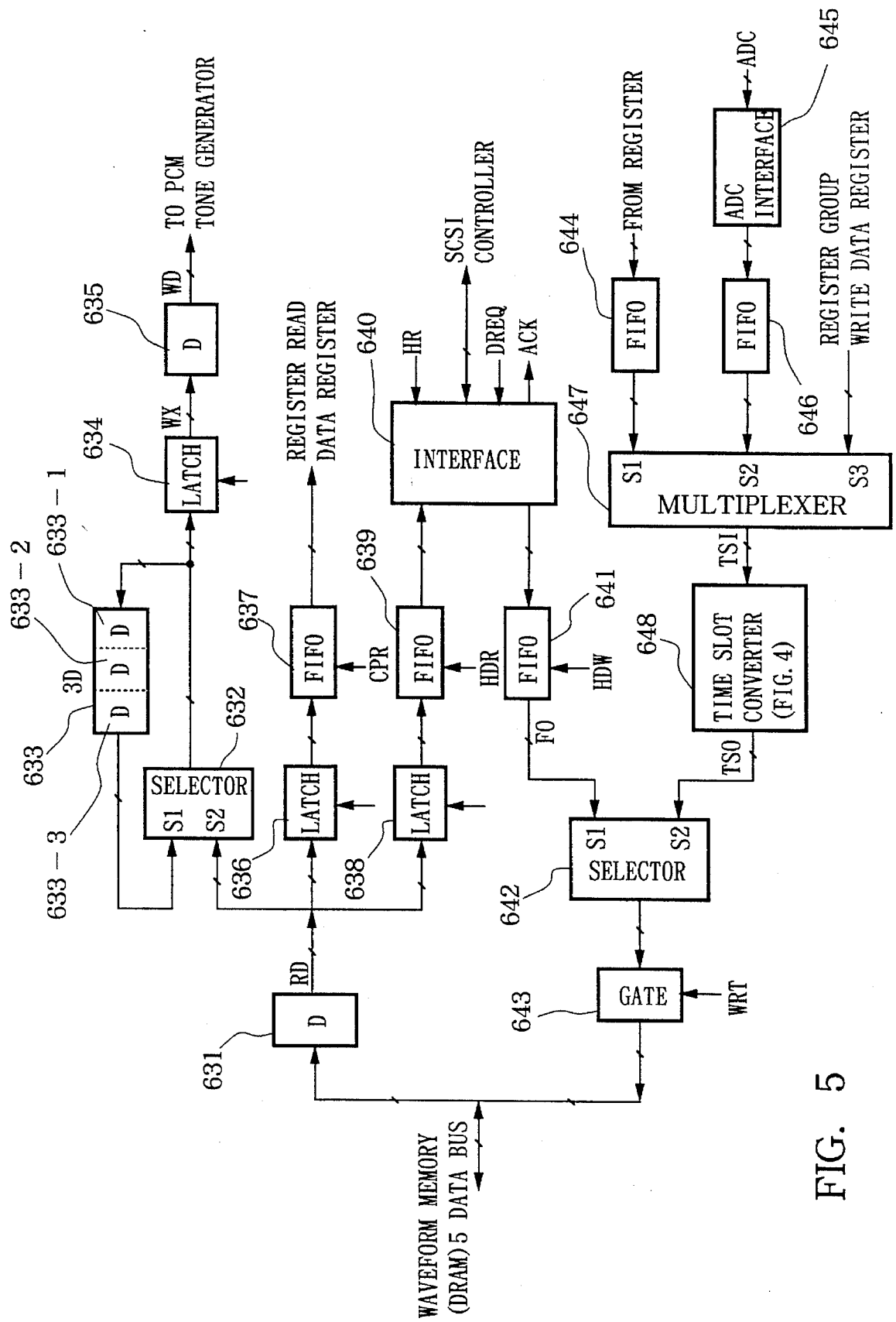
FIG. 5 is a block diagram (No. 2) of the DRAM control circuit.

FIG. 5 is a partial block diagram of the DRAM control circuit 6. FIG. 5 illustrates a portion for processing read/write data transferred with the waveform memory 5 in the DRAM control circuit 6. In FIG. 5, the DRAM control circuit 6 comprises a delay circuit 631, a selector 632, a delay circuit 633, a latch 634, a delay circuit 635, latches 636 and 638, FIFO (First-In, First-Out) circuits 637 and 639, a SCSI interface 640, a FIFO circuit 641, a selector 642, a gate circuit 643, an ADC interface 645, FIFO circuits 644 and 646, a multiplexer 647, and a time slot converter 648.

16

Figure 7:
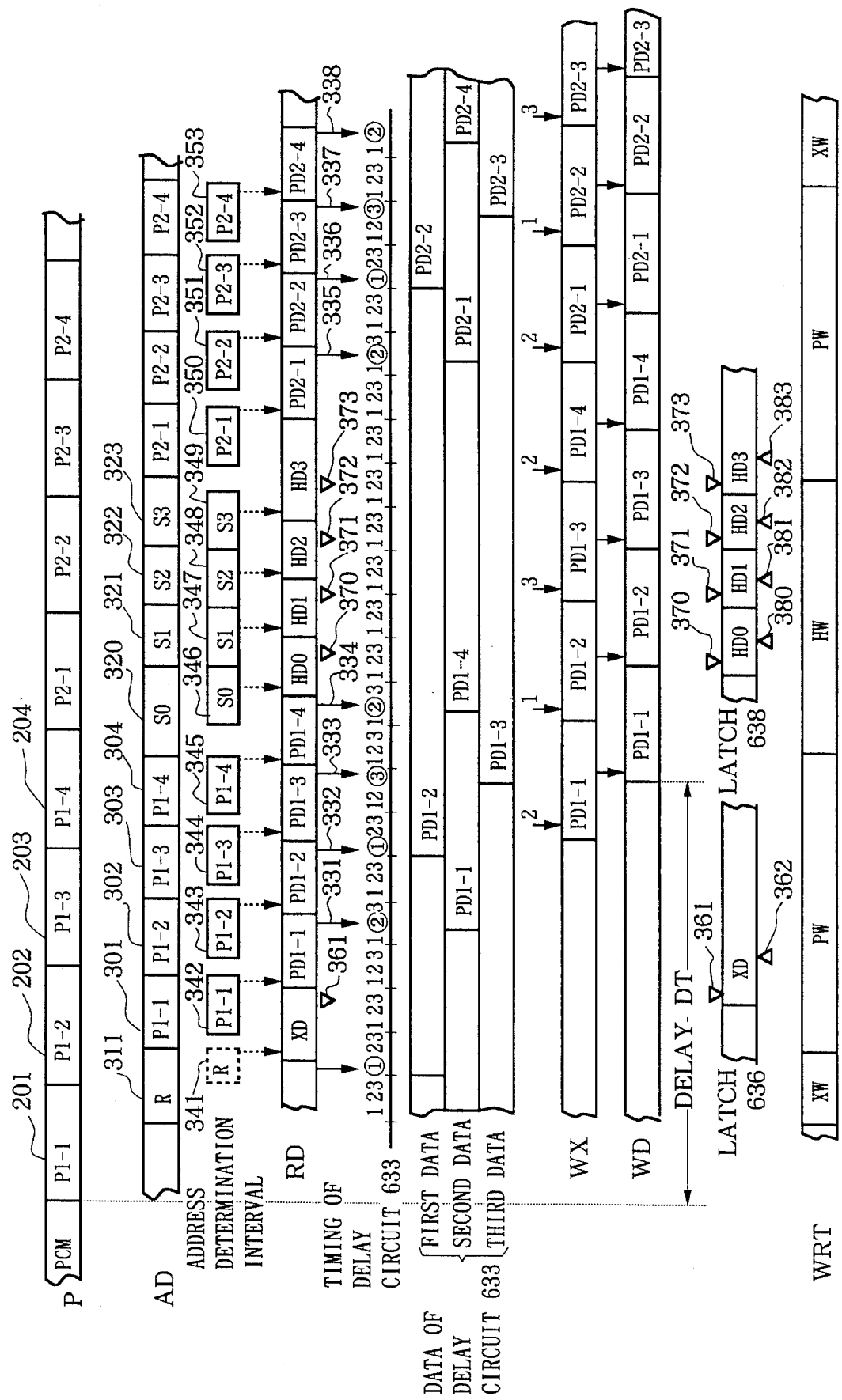
FIG. 7 is a timing chart for explaining data read processing from the waveform memory 5.

FIG. 7 is a timing chart for explaining data read processing from the waveform memory 5 by the DRAM control circuit 6 shown in FIG. 5.

The data flow in the data read processing by the PCM tone generator 7 will be described below with reference to the timing chart of FIG. 7 and the block diagram of FIG. 5. When the address data AD supplied from the DRAM control circuit 6 to the waveform memory 5 are the address data P1-1 to P2-4 and the like (the same applies to other channels) from the PCM tone generator 7, data read out from the waveform memory 5 in correspondence with these addresses are transferred to the PCM tone generator 7 via a path of delay circuit 631→selector 632→delay circuit 633→selector 632→latch 634→delay circuit 635. This data flow will be described below.

In FIG. 7, a sequence P represents address data outputted from the PCM tone generator 7 toward the input terminal PT of the multiplexer 608, and is the same as the sequence P in FIG. 6. As has been described above with reference to FIGS. 3 and 4 and FIG. 6, the DRAM control circuit 6 compresses these address data, fills the refresh address R and the hard disk transfer address S (S0 to S4) in the vacant time formed by compression to generate the address data AD, and outputs the address data AD to the waveform memory 5. A sequence AD in FIG. 7 represents this address data AD, and is the same as the sequence AD in FIG. 6.

When the waveform memory 5 fetches an address, the row address is supplied first, and is fetched in response to the row address strobe signal RAS. Then, the column address is supplied, and is fetched in response to the column address strobe signal CAS. Therefore, the address is determined in the waveform memory 5 after the column address is fetched, i.e., in intervals 341 to 353 shown in "address determination interval" in FIG. 7. In the refresh processing, since the column address is not significant, the interval 341 is indicated by a dotted line. When the access processing from the CPU 1 or the write processing of data from the ADC 10 is to be performed in place of the refresh processing, the interval 341 serves as the address determination interval.

Of the address determination intervals in FIG. 7, in particular, the intervals 342 to 345 and 350 to 353 in which the address data P1-1 to P2-4 from the PCM tone generator 7 are determined will be discussed. When an address is determined in each interval, waveform data is read out from the waveform memory 5, and is inputted to the delay circuit 631 in FIG. 5. The delay circuit 631 delays the readout waveform data by a predetermined period of time, and outputs the delayed data as output data RD.

A sequence RD in FIG. 7 represents the output data RD from the delay circuit 631 in FIG. 5. Reference symbols PD1-1 to PD1-4 respectively denote waveform data read out in correspondence with the addresses P1-1 to P1-4. The same applies to PD2-1 to PD2-4. A dotted arrow from a rectangle of each address determination interval to the output data RD indicates the correspondence between an address and data read out in accordance with the address.

The output data RD from the delay circuit 631 (FIG. 5) is inputted to an input terminal S2 of the selector 632. The output data from the selector 632 is inputted to the delay circuit 633, and is also inputted to the latch 634. The delay circuit 633 comprises 3-stage shift registers, and shifts input data from a register 633-1 to a register 633-2, from the register 633-2 to a register 633-3, . . . at predetermined timings. The delayed output from the register 633-3 is inputted to an input terminal S1 of the selector 632. Therefore, while the selector 632 selects and outputs data at the input terminal S1, data inputted to the delay circuit 633 is held while looping a loop circuit constituted by the delay circuit 633 and the selector 632.

"Timing of delay circuit 633" in FIG. 7 pays attention to the data held while looping the loop circuit. In "timing of delay circuit 633" in FIG. 7, in an interval described with "1", data written from the selector 632 in the delay circuit 633 in this interval becomes the first data, and data read out from the delay circuit 633 and inputted to the input terminal S1 of the selector 632 in this interval is the first data. Also, the next interval described with "2" indicates that the second data can be read out/written in this interval, and an interval described with indicates that the third data can be read out/written in this interval. The interval of "1", i.e., an interval in which the first data can be read out/written appears next to the interval described with "3". The delay circuit 633 holds these first to third data (looping the loop circuit).

Arrows 331 to 338 depending from rectangles of the output data RD in FIG. 7 indicate timings at which the selector 632 selects the data RD at the input terminal S2. At other timings, the selector 632 selects data at the input terminal S1.

As shown in FIG. 7, the data PD1-1 of the output data RD from the delay circuit 631 is written in the delay circuit 633 as the second data at the timing of the arrow 331. Similarly, the data PD1-2 is written as the first data in the delay circuit 633 at the timing of the arrow 332, the data PD1-3 is written in the delay circuit 633 as the third data at the timing of the arrow 333, and the data PD1-4 is written in the delay circuit 633 as the second data at the timing of the arrow 334. Also, the data PD2-1 to PD2-4 are respectively written in the delay circuit 633 at the timings of the arrows 335 to 338. Three sequences shown in "data of delay circuit 633" in FIG. 7 indicate waveform data to be held as the first to third data, respectively.

The latch 634 (FIG. 5) latches one of the first to third data, which loop, as described above, and outputs the latched data as output data WX. A sequence WX in FIG. 7 represents the output data WX from the latch 634. Of the output data WX, data described with "2" above the data PD1-1 represents that the latch 634 latches the second data (data PD1-1 in this case) in the interval in which the second data is outputted from the delay circuit 633. Numerical values described above other data PD1-2 to PD2-3 have the same meaning.

The output data WX from the latch 634 (FIG. 5) is inputted to the delay circuit 635 to be delayed by a predetermined period of time, and is outputted as output data WD. A sequence WD in FIG. 7 represents the output data WD from the delay circuit 635.

As described above, the waveform data WD finally outputted from the DRAM control circuit 6 is expanded to the duration of a time slot, which can be processed by the PCM tone generator 7, and is transferred to the PCM tone generator 7.

When the address data AD supplied from the DRAM control circuit 6 to the waveform memory 5 is the address data C from the CPU 1, data read out from the waveform memory 5 in correspondence with this address is written in the read data register of the register group 605 via a path of delay circuit 631→latch 636→FIFO circuit 637, and is then transferred to the CPU 1 via the CPU bus line 18. This data flow will be described below.

In a time slot in which the address data C supplied from the CPU 1 is inputted to the waveform memory 5, the refresh address R in the time slot 311 in the sequence AD in FIG. 7 can be replaced with the address C. Therefore, the read address C from the CPU 1 is determined in the interval 341.

When the address is determined, waveform data is read out from the waveform memory 5, and is inputted to the delay circuit 631 in FIG. 5. The delay circuit 631 delays the readout waveform data by a predetermined period of time, and outputs the delayed data as output data RD. XD in the sequence RD in FIG. 7 indicates the readout waveform data. The waveform data XD is latched by the latch 636 at a timing indicated by a triangular mark 361.

A lower chart in FIG. 7 shows the latched data XD in the latch 636. The waveform data latched by the latch 636 is temporarily stored in the FIFO circuit 637 at a timing (control clock CPR) indicated by a triangular mark 362. The FIFO circuit 637 is a FIFO type storage circuit. The waveform data inputted to the FIFO circuit 637 are sequentially read out to the read data register in the register group 605 (FIG. 3) in the FIFO manner. The CPU 1 acquires the readout waveform data from this read data register.

In this manner, the waveform data XD read out based on the address supplied from the CPU 1 is transferred to the CPU 1.

When the address data supplied from the DRAM control circuit 6 to the waveform memory 5 is the hard disk transfer address data S (S0 to S3), and data read out from the waveform memory 5 based on this address S is to be written in the hard disk 12, the data read out from the waveform memory 5 based on this address S is transferred to the SCSI controller 13 via a path of delay circuit 631→latch 638→FIFO circuit 639→SCSI interface 640, and is then written in the hard disk 12. This data flow will be described below.

Time slots in which the address S is inputted to the waveform memory 5 are time slots 320 to 323 in the sequence AD in FIG. 7. In intervals 346 to 349, the addresses are determined. When the addresses are determined, waveform data are read out from the waveform memory 5, and are inputted to the delay circuit 631 (FIG. 5). In this case, since the waveform data are read out from the waveform memory 5 using the high-speed access mode of the DRAM, four data are successively read out.

First, data read out based on the address determined in the interval 346 in FIG. 7 is inputted to the delay circuit 631 (FIG. 5). The delay circuit 631 delays the readout waveform data by a predetermined period of time, and outputs the delayed data as output data RD. HD0 in the sequence RD in FIG. 7 indicates the readout waveform data. The waveform data HD0 is latched by the latch 638 at a timing indicated by a triangular mark 370.

A lower chart in FIG. 7 shows the latched data in the latch 638. The waveform data HD0 latched by the latch 638 is temporarily stored in the FIFO circuit 639 at a timing (control clock HDR) indicated by a triangular mark 380. The FIFO circuit 639 is a FIFO type storage circuit. Similarly, waveform data HD1 to HD3 are latched by the latch 638 at timings indicated by triangular marks 371 to 373, and are temporarily stored in the FIFO circuit 639 at timings (control clocks HDR) indicated by triangular marks 381 to 383.

The waveform data inputted to the FIFO circuit 639 are sequentially inputted to the SCSI interface 640 in the FIFO manner. The SCSI interface 640 is a circuit for achieving interface in data transfer between the hard disk 12 and the waveform memory 5 together with the SCSI controller 13 shown in FIG. 1. The waveform data inputted from the FIFO circuit 639 to the SCSI interface 640 are supplied to the SCSI controller 13, and are written in the hard disk 12.

As described above, the waveform data HD0 to DH3 read out based on the addresses S0 to S3 are written in the hard disk 12.

Figure 8:
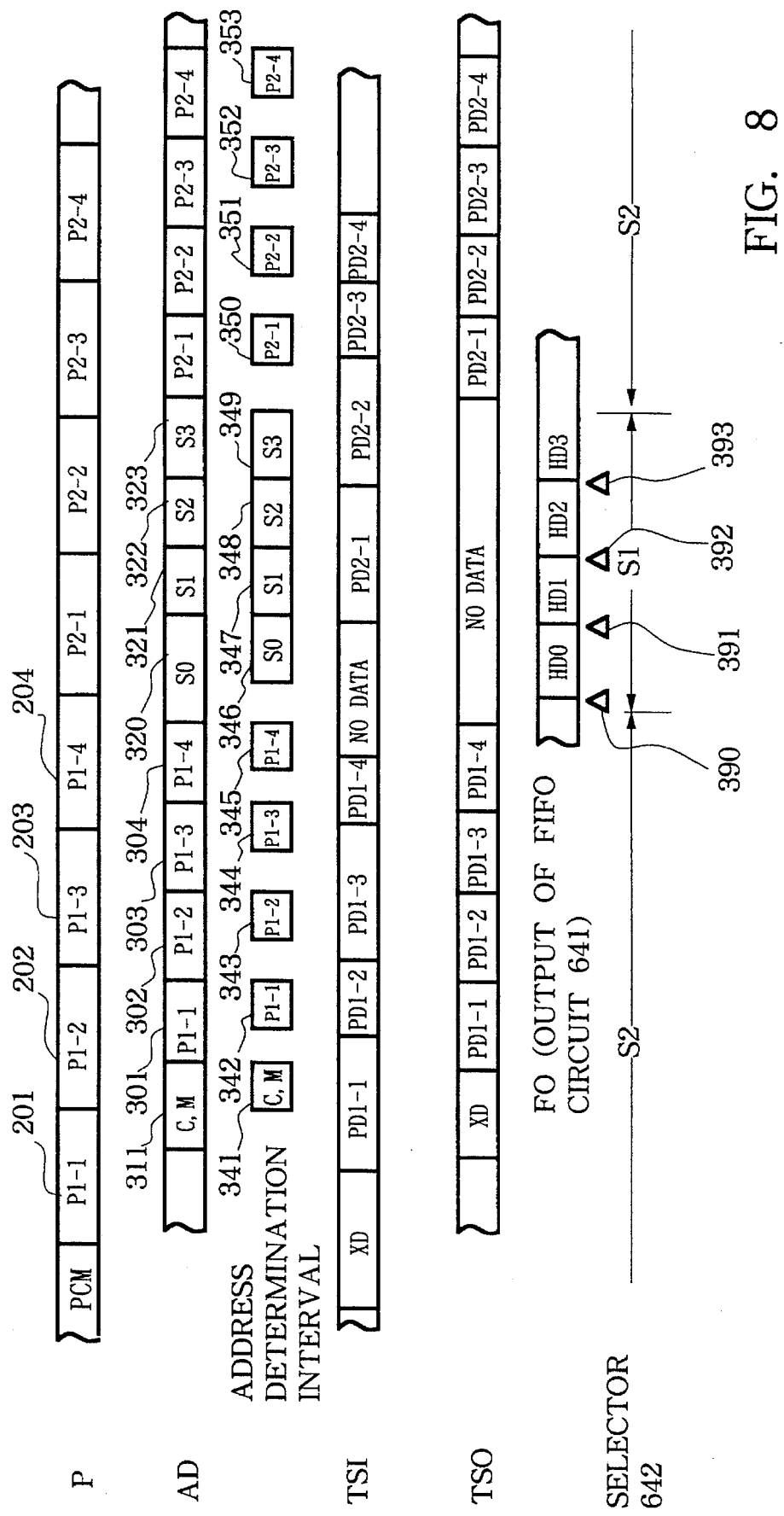
FIG. 8 is a timing chart for explaining data write processing into the waveform memory 5.

FIG. 8 is a timing chart for explaining data write processing in the waveform memory 5 by the DRAM control circuit 6 shown in FIG. 5.

The flow of write data when the data write processing is executed based on an address supplied from the CPU 1 at the timing shown in FIG. 2A will be described below with reference to the timing chart of FIG. 8 and the block diagram of FIG. 5. In this case, the CPU 1 writes data to be written in a predetermined register of the register group 605. This data is written in the waveform memory 5 via a path of FIFO circuit 644→multiplexer 647→time slot converter 648→selector 642→gate circuit 643. This data flow will be described below.

In FIG. 8, a sequence P represents address data outputted from the CPU 1 toward the input terminal PT of the multiplexer 608 via the predetermined register, and corresponds to the sequences P in FIGS. 6 and 7. A sequence AD in FIG. 8 represents the address data P1-1 to P2-4 inputted from the DRAM control circuit 6 to the waveform memory 5 as in the sequences AD in FIGS. 6 and 7. "Address determination interval" in FIG. 8 can also be considered as the same as "address determination interval" in FIG. 7.

In this manner, the write addresses P1-1 to P2-4 are determined. On the other hand, waveform data to be written are inputted to the FIFO circuit 644 in FIG. 5 via a predetermined register in the register group 605 in FIG. 3. The waveform data inputted to the FIFO circuit 644 are sequentially inputted to an input terminal S1 of the multiplexer 647 in the FIFO manner.

The multiplexer 647 selects one of the three input data in accordance with a control signal supplied from the register group 605 (FIG. 3). The write data PD1-1 to PD2-4 inputted from the FIFO circuit 644 will be discussed here. A sequence TSI in FIG. 8 represents output data TSI from the multiplexer 647. In other words, the multiplexer 647 selects and outputs the input data, as shown in the sequence TSI in FIG. 8. The output data TSI are inputted to the time slot converter 648.

The time slot converter 648 has an arrangement shown in FIG. 4 which is the same as that of the time slot converter 609 in FIG. 3. The time slot converter 609 in FIG. 3 processes the input address data, as shown in the sequence TI in FIG. 6, and outputs the address data TO, as shown in the sequence TO in FIG. 6. Similarly, the time slot converter in FIG. 5 receives and processes the waveform data, as shown in the sequence TSI in FIG. 8, and outputs waveform data TSO, as shown in a sequence TSO in FIG. 8.

The output data TSO from the time slot converter 648 are inputted to an input terminal S2 of the selector 642. The selector 642 selects and outputs one of the two input data in accordance with a control signal supplied from the register group 605 (FIG. 3). The lowermost chart in FIG. 8 shows the selection condition of the selector 642. In particular, while the waveform data PD1-1 to PD2-4 to be written are outputted from the time slot converter 648 as the output data TSO, the selector 642 selects and outputs these input data (input terminal S2).

The output data from the selector 642 are supplied to the waveform memory 5 via the gate circuit 643. The gate circuit 643 is enabled when the write/read signal WRT supplied from the control clock generator 606 (FIG. 3) instructs a write operation, and supplies the waveform data outputted from the selector 642 to the waveform memory 5. As shown in FIG. 8, when the waveform data PD1-1 to PD2-4 are supplied to the waveform memory 5, the corresponding write addresses P1-1 to P2-4 are determined, and the write control signal WR goes to low level in these intervals (or may be set at low level before the addresses are determined), thereby writing the waveform data PD1-1 to PD2-4 in the waveform memory 5.

In this manner, the data from the CPU 1 are written in the waveform memory 5 using the access timings shown in FIG. 2A.

When the address data AD supplied from the DRAM control circuit 6 to the waveform memory 5 are the hard disk transfer address data S (S0 to S3), and waveform data read out from the hard disk 12 are to be written in the waveform memory 5 based on the addresses S, data read out from the hard disk 12 via the SCSI controller 13 are written in the waveform memory 5 via a path of SCSI interface 640→FIFO circuit 641→selector 642→gate circuit 643. This data flow will be described below.

Waveform data read out from the hard disk 12 and inputted to the SCSI interface 640 via the SCSI controller 13 are temporarily stored in the FIFO circuit 641 (FIG. 5). The FIFO circuit 641 is a FIFO type storage circuit having at least four storage areas. The waveform data temporarily stored in the FIFO circuit 641 are sequentially read in accordance with the hard disk write clocks HDW supplied from the control clock generator 606 (FIG. 3) in the FIFO manner, and are inputted to an input terminal S1 of the selector 642.

A lower sequence in FIG. 8 represents output data FO from the FIFO circuit 641. Triangular marks 390 to 393 indicate timings (control clocks HDW) at which data are outputted from the FIFO circuit 641. HD0 to HD3 represent waveform data outputted from the FIFO circuit 641. According to the lowermost chart in FIG. 8 showing the selection condition of the selector 642, in intervals in which the waveform data HD0 to HD3 are outputted from the FIFO circuit 641, the selector 642 selects these data (input terminal S1). The output data from the selector 642 are supplied to the waveform memory 5 via the gate circuit 643. The gate circuit 643 is enabled when the write/read signal WRT supplied from the control clock generator 606 (FIG. 3) instructs a write operation, and supplies the waveform data outputted from the selector 642 to the waveform memory 5.

As shown in FIG. 8, when the waveform data HD0 to HD3 are outputted to the waveform memory 5, the write addresses S0 to S3 are determined in intervals 346 to 349, respectively. When the write control signal WR goes to low level (or is set at low level before the addresses are determined) in these intervals, the waveform data HD0 to HD3 are written in the waveform memory 5.

In this manner, the waveform data read out from the hard disk 12 can be written in the waveform memory 5.

Waveform data outputted from the ADC 10 are written in the waveform memory 5 via a path of ADC interface 645→FIFO circuit 646→multiplexer 647→time slot converter 648→selector 642→gate circuit 643. In this case, a write address is the write address M supplied from the DRAM control circuit 6. The flow of waveform data in this case will be described below.

A time slot in which the write address M is inputted to the waveform memory 5 is a time slot 311 in the sequence AD in FIG. 8, and this write address M is determined in an interval 341.

On the other hand, waveform data to be written are supplied from the ADC 10 in FIG. 1, and are temporarily stored in the FIFO circuit 646 via the ADC interface 645. The waveform data temporarily stored in the FIFO circuit 646 are sequentially read out in the FIFO manner, and are inputted to an input terminal S2 of the multiplexer 647.

The multiplexer 647 selects and outputs one of the three input data in accordance with a control signal supplied from the register group 605 (FIG. 3). In this case, write data XD inputted from the FIFO circuit 646 will be discussed. This write data XD is outputted from the multiplexer 647, as indicated by XD in the sequence TSI in FIG. 8, and is inputted to the time slot converter 648. The data XD is outputted from the converter 648, as indicated by XD in the sequence TSO in FIG. 8, and is inputted to the input terminal S2 of the selector 642. In an interval in which the time slot converter 648 outputs this waveform data XD, the selector 642 selects and outputs the input data XD (input terminal S2). The output data from the selector 642 are supplied to the waveform memory 5 via the gate circuit 643. The gate circuit 643 is enabled when the write/read signal WRT supplied from the control clock generator 606 (FIG. 3) instructs a write operation, and supplies the waveform data outputted from the selector 642 to the waveform memory 5.

As shown in FIG. 8, when the waveform data XD are supplied to the waveform memory 5, the corresponding write address M is determined, and when the write control signal WR goes to low level (or is set at low level before the address is determined) in this interval, the waveform data XD are written in the waveform memory 5.

In this manner, the waveform data from the ADC 10 can be written in the waveform memory 5.

Data written in the write data register in the register group 605 by the CPU 1 is written in the waveform memory 5 via a path of multiplexer 647→time slot converter 648→selector 642→gate circuit 643. In this case, a write address is the write address C supplied from the DRAM control circuit 6. The flow of the waveform data at this time is substantially the same as that of the waveform data from the ADC 10. In this case, the waveform data outputted from the write data register is directly inputted to an input terminal S3 of the multiplexer 647.

As described above, read/write data are exchanged between the DRAM control circuit 6 and the waveform memory 5. Note that the timing charts are divided in units of processing for the sake of convenience; FIG. 7 shows the read processing from the waveform memory 5, and FIG. 8 shows the write processing to the waveform memory 5. However, since the read/write mode of each time slot can be instructed from the CPU 1, read and write slots can be mixed, as a matter of course. For example, when the control signal XW is set in a write instruction mode in an interval in which data from the ADC 10 is to be written, the control signal PW is set in a read instruction mode in an interval in which waveform data is to be read out by the PCM tone generator 7, and the control signal HW is set in a write instruction mode in an interval in which data transfer with the hard disk 12 is to be performed, data from the ADC 10 and the hard disk 12 can be written in the waveform memory while reading out and reproducing waveform data by the PCM tone generator 7.

When the PCM tone generator 7 reads out waveform data, all the 16 channels can be used for tone generation, and tone generation channels need not be assigned to data transfer with the hard disk unlike in the conventional system.

Furthermore, since waveform data in the hard disk 12 can be transferred to the waveform memory 5 while reading out and reproducing waveform data from the waveform memory 5, long waveform data beyond the capacity of the waveform memory 5 can be reproduced. When tones from an external source are to be recorded, waveform data inputted from the ADC 10 is temporarily stored in the waveform memory 5. If the waveform memory 5 can no longer store any data, the waveform data in the waveform memory 5 can be transferred to the hard disk 12, and tones from an external source can be recorded for a long period of time until the hard disk 12 is full of data.

This embodiment is particularly suitable for a case wherein the PCM tone generator and the DRAM have a processing performance difference therebetween, i.e., a case wherein the PCM tone generator must execute processing according to time slots of a predetermined duration, but the DRAM can read/write data using time slots having a shorter duration than that of the PCM tone generator.

In this embodiment, in accesses from the PCM tone generator 7, data for each channel is successively read out four times to acquire four waveform data, as shown in FIG. 2A. However, the present invention is not limited to this, and waveform data for one channel may be obtained in discrete time slots. In practice, in consideration of the executing timing of interpolation processing in the PCM tone generator 7, after waveform data for a certain channel is read out in a certain time slot, waveform data of this channel is often read out in the 16th channel.

In the above embodiment, the refresh counter 602, the ADC write counter 603, and the hard disk transfer counter 604 in FIG. 3 are separately arranged. However, since these counters do not require high-speed processing, a single counter may be time-divisionally used.

As described above, according to the present invention, since the durations of time slots of address data outputted from the data processing means are compressed to form a vacant time, and refresh processing of the memory, hard disk transfer processing, and the like are performed using the vacant time, the refresh processing, the hard disk transfer processing, and the like can be executed while normally executing memory accesses from the data processing means. Therefore, when the present invention is applied to a tone generator system, waveform data supplied from another unit can be written in the waveform memory parallel to tone generation using all tone generation channels for tone generation.

What is claimed is:

1. A memory control apparatus arranged between a memory and data processing means comprising:

address generation means for generating first address data to execute refresh processing of said memory or data transfer processing between a second data processing means and said memory;

time slot compression means for receiving second address data sequentially outputted from said data processing means in each time slot of a first time width, compressing said first time width to a second time width shorter than said first time width, sequentially outputting said second address data in time slots having said second time width, inserting said first address data in a vacant time slot corresponding to a time slot formed by the compression, and sequentially outputting the first address data and the second address data;

control means for reading out data from said memory based on the second address data during time slots having said second time width in which address data sequentially outputted from said time slot compression means is said second address data, and for executing said refresh processing of said memory or said data transfer processing between said second data processing means and said memory during time slots in which address data sequentially outputted from said time slot compression means is said first address data; and time slot expansion means for expanding a time width of said data read from said memory by said control means to said first time width, and supplying expanded data to said data processing means in time slots having said first time width.

2. An apparatus according to claim 1, wherein said memory comprises a dynamic RAM.

3. An apparatus according to claim 2, wherein said dynamic RAM is accessed by a row address and a plurality of column addresses.

4. An apparatus according to claim 2, wherein said refresh processing is executed during said vacant time slot.

5. An apparatus according to claim 1, wherein said data transfer processing between said another processing means and said memory is executed during said vacant time slot.

6. An apparatus according to claim 1, wherein said memory comprises a tone waveform memory for storing tone waveform data.

7. An apparatus according to claim 6, wherein said data processing means comprises a tone generator having a plurality of time-divisional channels, each generating a tone on the basis of said tone waveform data from said tone waveform memory.

8. An apparatus according to claim 5, wherein said second processing means comprises an auxiliary storage device.

9. An apparatus according to claim 5, wherein said second processing means comprises recording means for sampling an acoustic sound.

10. An apparatus according to claim 5, wherein said second processing means comprises an external MIDI (Musical Instrument Digital Interface) device.

11. An apparatus according to claim 5, wherein said data transfer processing is read/write processing of data from a central processing unit (CPU) to said memory.

12. A memory control apparatus arranged between a memory and data processing means comprising:

address generation means for generating first address data to execute refresh processing of said memory or data transfer processing between a second data processing means and said memory;

address time slot compression means for receiving second address data sequentially outputted from said data processing means in time slots having a first time width, compressing said first time width to a second time width shorter than said first time width, sequentially outputting said second address data in time slots having said second time width, inserting said first address data in a vacant time slot corresponding to a time slot formed by the compression, and sequentially outputting said first address data and said second address data;

data time slot compression means for receiving write data sequentially outputted from said data processing means in time slots having said first time width, compressing said first time width to said second time width, and sequentially outputting said write data in time slots having said second time width; and control means for, during time slots having said second time width in which address data sequentially outputted from said address time slot compression means is said second address data, writing the write data outputted from said data time slot compression means at an address of said memory corresponding to said second address data, and for, during time slots in which address data sequentially outputted from said address time slot compression means is said first address data, executing said refresh processing or said data transfer processing.

13. An apparatus according to claim 12, wherein said memory comprises a dynamic RAM.

14. An apparatus according to claim 13, wherein said dynamic RAM is accessed by a row address and a plurality of column addresses.

15. An apparatus according to claim 13, wherein the refresh processing of said memory is executed during said vacant time slot.

16. An apparatus according to claim 12, wherein said data transfer processing is executed during said vacant time slot.

17. An apparatus according to claim 12, wherein said memory comprises a tone waveform memory for storing tone waveform data.

18. An apparatus according to claim 17, wherein said data processing means comprises a tone generator having a plurality of time-divisional channels, each generating a tone on the basis of said tone waveform data from said tone waveform memory.

19. An apparatus according to claim 16, wherein said second processing means comprises an auxiliary storage device.

20. An apparatus according to claim 16, wherein said second processing means comprises recording means for sampling an acoustic sound.

21. An apparatus according to claim 16, wherein said second processing means comprises an external MIDI (Musical Instrument Digital Interface) device.

22. An apparatus according to claim 16, wherein said data transfer processing is read/write processing of data from a central processing unit (CPU) to said memory.

\* \* \* \* \*